(12) United States Patent
Sato et al.

(10) Patent No.: US 8,997,581 B2
(45) Date of Patent: Apr. 7, 2015

(54) FLOW RATE MEASURING DEVICE

(75) Inventors: Harumichi Sato, Tsukuba (JP); Jun Akedo, Tsukuba (JP); Eiichi Murakami, Tokyo (JP)

(73) Assignee: National Institute of Advanced Industrial Science and Technology Atsuden Co., Ltd. (JP)

( * ) Notice: Subject to any disclaimer, the term of this patent is extended or adjusted under 35 U.S.C. 154(b) by 378 days.

(21) Appl. No.: 13/511,622

(22) PCT Filed: Nov. 5, 2010

(86) PCT No.: PCT/JP2010/069667
§ 371 (c)(1),
(2), (4) Date: May 23, 2012

(87) PCT Pub. No.: WO2011/065201
PCT Pub. Date: Jun. 3, 2011

(65) Prior Publication Data
US 2012/0272747 A1 Nov. 1, 2012

(30) Foreign Application Priority Data
Nov. 30, 2009 (JP) .................. 2009-272705

(51) Int. Cl.
*G01F 1/20* (2006.01)
*G01F 1/66* (2006.01)
(52) U.S. Cl.
CPC ..................... *G01F 1/667* (2013.01)
(58) Field of Classification Search
CPC ........................................... G01F 1/66
USPC ................................... 73/861.28
See application file for complete search history.

(56) References Cited

U.S. PATENT DOCUMENTS 4,527,433 A * 7/1985 Gutterman ............... 73/861.28
6,062,091 A * 5/2000 Baumoel ................. 73/861.27
6,644,119 B1 * 11/2003 Sinha ...................... 73/579

FOREIGN PATENT DOCUMENTS

JP 6001209 1/1994 ........... G01F 1/66

(Continued)

OTHER PUBLICATIONS

International Search Report issued in corresponding PCT Application No. PCT/JP2010/069667 dated Jan. 18, 2011.(with English translation) (4 pgs).
"Theoretical and Experimental Investigations of the Propagation of Guide Waves in Cylindrical Pipe Filled with Fluid" Sato et al. Proc. Symp. Ultrason. Electron., vol. 26, (2005) pp. 443-444 (2 pgs).

(Continued)

*Primary Examiner* — Hezron E Williams
*Assistant Examiner* — Mark A Shabman
(74) *Attorney, Agent, or Firm* — Hayes Soloway P.C.

(57) ABSTRACT

[Problem] A flow rate measuring device in which guided waves are used, wherein the frequency of ultrasound is optimized; and energy injected from ultrasound transmission/reception elements is increased and the flow velocity sensitivity is raised; whereby the measurement accuracy is improved.
[Solution] A frequency of an isolated peak of group velocities of guided waves, from among a plurality of peaks of group velocities of guided waves, and a resonance frequency of the ultrasound transmission element/reception element are set to agree; and the semi-amplitude of a power spectrum of ultrasound excited/received by the ultrasound transmission element/reception element is set to a value that does not overlap with another peak of group velocities.

16 Claims, 9 Drawing Sheets

(56) References Cited

FOREIGN PATENT DOCUMENTS

| | | | |
|---|---|---|---|
| JP | 2000171478 | 6/2000 | ................ G01P 5/00 |
| JP | 2004028994 | 1/2004 | ................ G01F 1/66 |
| JP | 2007298275 | 11/2007 | ................ G01F 1/66 |
| JP | 2009008406 | 1/2009 | ................ G01F 1/66 |
| JP | 2009109299 | 5/2009 | ................ G01F 1/66 |

OTHER PUBLICATIONS

"Theoretical and Experimental Investigation of Propagation of Guide Waves in Cylindrical Pipe Filled with Fluid" Sato et al. Japanese Journal of Applied Physics, vol. 45, No. 5B, 2006, pp. 4573-4576 (5 pgs).

International Preliminary Report on Patentability, dated Jul. 10, 2012 (7 pgs).

* cited by examiner

US 8,997,581 B2

FLOW RATE MEASURING DEVICE

TECHNICAL FIELD

The present invention relates to a flow rate measuring device in which ultrasound is used, and in particular to a device for measuring, in a contactless manner, the flow velocity of a fluid flowing within a thin tube used in a semiconductor manufacturing device or a similar device.

BACKGROUND ART

Conventionally, with regards to a flow rate measuring device in which ultrasound is used, there is known a flow rate meter, referred to as a propagation velocity difference-type ultrasonic flow rate meter, for propagating ultrasound into a fluid flowing through a tube path, obtaining the velocity of the fluid from the difference between the velocity of ultrasound propagation from upstream to downstream and the velocity of ultrasound propagation from downstream to upstream of the flow, and measuring the flow rate of the fluid flowing through the tube path on the basis of the velocity of the fluid.

However, with regards to the above-mentioned flow rate measuring device in which ultrasound is used, waves propagating through the pipe have not been properly theoretically analyzed, and optimization has therefore been difficult.

The inventors of the present invention have been conducting research on the relationship between the flow velocity of a fluid flowing in a pipe and the propagation velocity of guided waves excited by an ultrasound transmission element; and discovered, as a result, that a change in the flow velocity of the fluid affects the propagation velocity of the guided waves propagating through the pipe. The inventors are presently continuing the research.

In the present specification, "guided waves" refers to ultrasound that propagates in a longitudinal direction along a plate, rod, pipe, or a similar medium that has a boundary.

Also, the applicants of the present specifications have, in the past, filed Japanese Patent Application No. 2006-109218 (see JP-A 2007-298275; hereafter referred to as "Prior Art 1") and Japanese Patent Application No. 2007-280888 (see JP-A 2009-109299; hereafter referred to as "Prior Art 2") in relation to inventions of a flow rate measuring device in which guided waves are used.

In Prior Art 1, it is verified that a wave propagating through a pipe filled with static water is a guided wave; and there is proposed a flow rate measuring device in which: two ultrasound oscillators are provided, with a distance L present therebetween, on an outer surface of a pipe for channeling a fluid; one of the two ultrasound oscillators is actuated as a transmission element, and the other is actuated as a reception element, with respect to each other; and there is provided a control/analysis device for obtaining the flow velocity of the fluid from the propagation time difference between a propagation time T1 and a propagation time T2, the propagation time T1 being a time in which guided waves, excited by being driven by the ultrasound oscillator with the pipe and the internal fluid acting as a single medium, propagate from upstream to downstream between the ultrasound transmission and reception elements that are separated by a spacing of L, and the propagation time T2 being a time in which the guided waves propagate from downstream to upstream.

In Prior Art 2, there is proposed a flow rate measuring device which is a modification of the flow rate measuring device according to Prior Art 1, the flow rate measuring device being one in which ultrasound is used, in which: two ultrasound oscillators are provided, with a distance L present therebetween, on an outer surface of a pipe for channeling a fluid; one of the two ultrasound oscillators is actuated as a transmission element, and the other is actuated as a reception element, with respect to each other; and there is provided a control/analysis device for obtaining the flow velocity of the fluid from the propagation time difference between a propagation time T1 and a propagation time T2, the propagation time T1 being a time in which guided waves, excited by being driven by the ultrasound oscillator with the pipe and the internal fluid acting as a single medium, propagate from upstream to downstream between the ultrasound transmission and reception elements that are separated by a spacing of L, and the propagation time T2 being a time in which the guided waves propagate from downstream to upstream; wherein the flow rate measuring device in which ultrasound is used is characterized in that the guided waves used have a mode such that the variation in the phase velocity decreases near the longitudinal sound velocity of the fluid.

Non-patent References 1 and 2 are known analyses of guided waves propagating through a pipe filled with static water.

PRIOR ART REFERENCES

Patent References

Patent Reference 1: JP-A 2007-298275
Patent Reference 2: JP-A 2009-109299

Non-Patent References

Non-patent Reference 1: Harumichi Sato, Maxim Lebedev, Jun Akedo, Proc. Symp. Ultrason. Electron., 26 (2005) 443
Non-patent Reference 2: Harumichi Sato et al., JAPANESE JOURNAL OF APPLIED PHYSICS, 45-5B (2006) pp. 4573-4576

DISCLOSURE OF THE INVENTION

Problems to be Solved by the Invention

Prior Art 1 and Prior Art 2 are flow rate measuring devices in which guided waves are used; however, the following problems are presented.

(1) It is indicated that there are used guided waves that have a mode such that the variation in the phase velocity decreases near the longitudinal sound velocity of the fluid. However, no specific indication exists as to which frequency is to be selected. Even when an ultrasound transmission/reception element is to be caused to oscillate at a selected frequency, in reality, there exist differences between individual piezoelectric elements, differences between individual pipes, characteristics of an electronic circuit, and other factors; and it is difficult to cause the frequency at which the ultrasound transmission/reception element oscillates to agree with the selected frequency.

(2) Guided waves having a plurality of frequencies are detected simultaneously, and beat is generated. The waveform of the beat changes when there is a displacement in a frequency peak caused by, e.g., the effect of temperature, adversely affecting the flow rate measurement.

(3) A decrease in the diameter of the pipe channeling the fluid reduces the diameter of the ultrasound transmission/reception elements, thus reducing the amount of energy that can be injected. An increase in the diameter of the pipe channeling the fluid reduces the flow velocity, thus causing a fall in the flow velocity sensitivity.

The present invention was devised in view of the problems of the prior art. An objective of the present invention is to provide a flow rate measuring device in which the frequency of ultrasound is optimized and it is made possible to measure a guided wave having a frequency that corresponds to a peak of group velocities (i.e., a first wave to be propagated); and energy injected from the ultrasound transmission/reception elements is increased, the reception sensitivity is raised, and the flow velocity sensitivity is raised; whereby the measurement accuracy is improved.

Means for Solving the Above-Mentioned Problems

In order to achieve the above-mentioned objective, a first aspect of a flow rate measuring device of the present invention is a flow rate measuring device wherein: an ultrasound transmission element/reception element is respectively provided, with a distance L present therebetween, on both sides of a flow rate measurement part; and there is obtained a flow velocity of a fluid from a propagation time difference between a propagation time $T_1$ and a propagation time $T_2$, the propagation time $T_1$ being a time in which a guided wave, excited by being driven by the ultrasound transmission element, propagates from upstream to downstream to the ultrasound reception element positioned set apart by gap L, and the propagation time $T_2$ being a time in which the guided wave propagates from downstream to upstream; the flow rate measuring device being characterized in that: a frequency of an isolated peak of group velocities of guided waves, from among a plurality of peaks of group velocities of guided waves, and a resonance frequency of the ultrasound transmission element/reception element are set so as to agree; and the semi-amplitude of a power spectrum of ultrasound excited/received by the ultrasound transmission element/reception element is set to a value that does not overlap with another peak of group velocities.

The expression "agree with" in the aforementioned "a frequency of an isolated peak of group velocities of guided waves, from among a plurality of peaks of group velocities of guided waves, and a resonance frequency of the ultrasound transmission element/reception element are set so as to agree" refers to, in addition to an instance in which the frequencies agree in the strictest sense, an instance in which the frequencies agree within a range of a half width of a power spectrum of ultrasound excited/received by the ultrasound transmission element/reception element.

Also, a signal actually used in the calculation of the flow velocity is a signal that has passed through the resonance circuits and the amplifiers. Therefore, it is important that a signal that has passed agrees with the frequency of an isolated peak of group velocities of guided waves, from among a plurality of peaks of group velocities of guided waves, within a range of the half life of the power spectrum.

The first aspect makes it possible to optimize the frequency emitted by the ultrasound transmission element and measure only the guided wave having a frequency that corresponds to a peak of a plurality of group velocities (i.e., first wave to be propagated). Therefore, it is possible to prevent an instance in which guided waves of a plurality of frequencies are detected simultaneously and beat is generated, or an instance in which the waveform of the beat changes when there is a displacement in a frequency peak caused by, e.g., the effect of temperature, adversely affecting the flow rate measurement.

A flow rate measuring device according to a second aspect of the present invention is the flow rate measuring device according to the first aspect, characterized in that an amplification circuit, in which a resonance circuit, an amplifier, a resonance circuit, and an amplifier are sequentially arranged, is provided between a pulse generation circuit and the ultrasound transmission element/reception element on both sides.

A flow rate measuring device according to a third aspect of the present invention is the flow rate measuring device according to the first aspect, characterized in that an amplification circuit, in which a resonance circuit, an amplifier, a resonance circuit, and an amplifier are sequentially arranged, is provided between the ultrasound transmission element/reception element on both sides and a controller on a flow-rate-measurement side.

The second and third aspects make it possible to amplify the signal and reduce a half width $\Delta f$ of the power spectrum of ultrasound that is excited or detected, and contribute towards preventing guided waves of a plurality of frequencies from being detected simultaneously.

A flow rate measuring device according to a fourth aspect of the present invention is the flow rate measuring device according to any of the first through third aspects, characterized in that the diameter of an entrance side and an exit side of a flow path of the flow rate measurement part is set so as to be large; the diameter of a center section is set so as to be small; and the entrance side as well as the exit side are connected to the center section in a tapered manner.

A flow rate measuring device according to a fifth aspect of the present invention is the flow rate measuring device according to the fourth aspect, characterized in that, where $\phi_1$ is the diameter of a large-diameter flow path in the entrance side and the exit side of the flow path of the flow rate measurement part, and $\phi_2$ is the diameter of a small-diameter flow path in the center section, $\phi_2/\phi_1$ is set to a range of $1/10$ to $2/3$.

A flow rate measuring device according to a sixth aspect of the present invention is the flow rate measuring device according to the fourth or fifth aspects, characterized in that, where $L_0$ is the total length of the flow path of the flow rate measurement part and $L_1$ is the length of the small-diameter flow path at the center section, $L_1/L_0$ is set to a range of 0.6 to 0.98.

The fourth through sixth aspects make it possible to increase the amount of energy that can be injected from the ultrasound transmission element into the flow path, raise the reception sensitivity, and raise the flow velocity of the flow path, therefore making it possible to significantly raise the detection sensitivity of flow rate measurement.

Effect of the Invention

The present invention has the following advantageous effects.

(1) Setting a frequency of an isolated peak of group velocities of guided waves, from among a plurality of peaks of group velocities of guided waves, and a resonance frequency of the ultrasound transmission element/reception element so as to agree; and setting the semi-amplitude of a power spectrum of ultrasound excited/received by the ultrasound transmission element/reception element to a value that does not overlap with another peak of group velocities, make it possible to optimize the frequency emitted by the ultrasound transmission element and measure only the guided wave having a frequency that corresponds to a peak of a plurality of group velocities (i.e., first wave to be propagated). Therefore, it is possible to prevent an instance in which guided waves of a plurality of frequencies are detected simultaneously and beat is generated, or an instance in which the waveform of the beat changes when there is a displacement in a frequency peak caused by, e.g., the effect of temperature, adversely affecting the flow rate measurement.

(2) Providing an amplification circuit, in which a resonance circuit, an amplifier, a resonance circuit, and an amplifier are sequentially arranged, between the pulse generation circuit and the ultrasound transmission element/reception element or between the ultrasound transmission element/reception element on both sides and the controller on a flow-rate-measurement side, makes it possible to amplify the signal and reduce the half width Δf of the power spectrum of ultrasound that is excited or detected, and contribute towards preventing guided waves of a plurality of frequencies from being detected simultaneously.

(3) Setting the diameter of the entrance side and the exit side of the flow path of the flow rate measurement part so as to be large, setting the diameter of a center section so as to be small, and connecting the entrance side as well as the exit side to the center section in a tapered manner make it possible to increase the amount of energy that can be injected from the ultrasound transmission element to the flow path, raise the reception sensitivity, and raise the flow velocity of the flow path; therefore making it possible to significantly raise the detection sensitivity of flow rate measurement.

BEST MODE FOR CARRYING OUT THE INVENTION

An embodiment of the flow rate measuring device according to the present invention will now be described in detail with reference to the accompanying drawings. However, the present invention is not to be construed as being limited thereto. A variety of modifications, amendments, and improvements can be made on the basis of the knowledge of the person having ordinary skill in the art without departing from the scope of the present invention.

(Principles of Flow Velocity Measurement)

Figure 1:
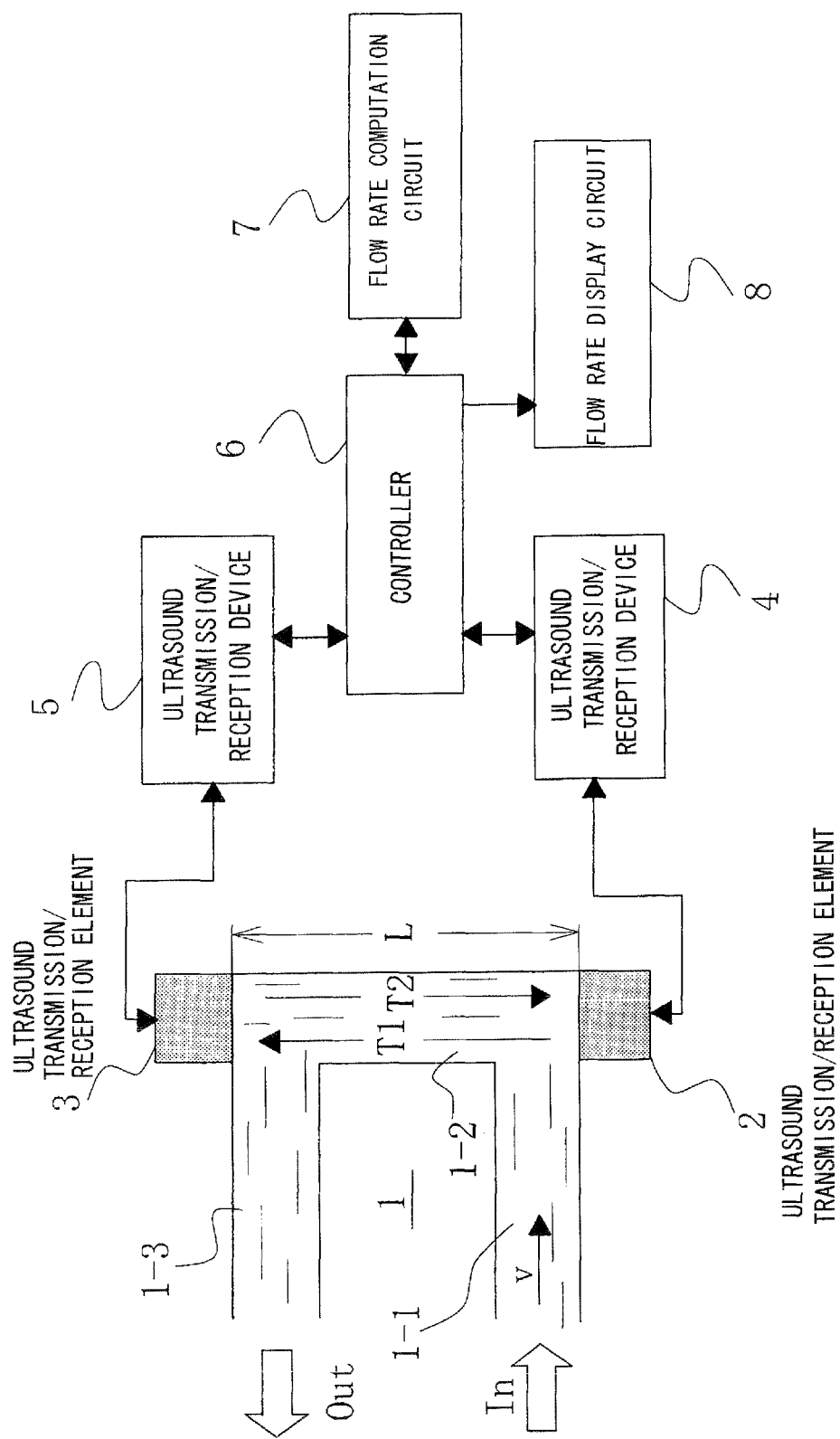
FIG. 1 is an illustrative drawing used to illustrate the principles of measuring the flow velocity using a flow rate measuring device according to an embodiment of the present invention.

FIG. 1 is a drawing used to illustrate the principles of measuring the flow velocity using a flow rate measuring device according to an embodiment of the present invention.

In FIG. 1, a U-shaped ultrasonic flow rate measurement tube 1 that opens leftwards is formed from a fluid inflow part 1-1, a flow rate measurement part 1-2, and a fluid outflow part 1-3.

Ultrasound transmission/reception elements 2, 3 are respectively disposed, with a predetermined distance L present therebetween, on an upstream side and a downstream side with respect to a flow direction, in the flow rate measurement part 1-2 of the ultrasonic flow velocity measurement tube 1. Each of the ultrasound transmission/reception elements 2, 3 is driven by a drive pulse from an ultrasound transmission/reception device 4, 5, respectively, is made to oscillate, and is made to generate and transmit ultrasound, while also receiving ultrasound that has been transmitted. A reception wave corresponding to when the ultrasound transmission/reception elements 2, 3 oscillate is sent, via the ultrasound transmission/reception device 4, 5 and a controller 6, to a flow rate computation circuit 7; and the computation result is sent to a flow rate display circuit 8.

In FIG. 1, an ultrasound transmission/reception element 2, 3 is provided on each side of the flow rate measurement part 1-2, and a transmission function and a reception function are used in a switching manner. However, it shall be apparent that a configuration is also possible in which a set comprising an ultrasound transmission element and a reception element are provided to each of both sides of the flow rate measurement part 1-2; and that a configuration is also possible in which two sets of electric circuits are provided and transmission elements (transmission/reception elements) on both sides simultaneously transmit ultrasound and reception elements (transmission/reception elements) on both sides simultaneously receive ultrasound. In the present specification, the description of an ultrasound transmission element/reception element being provided to each of both sides of the flow rate measurement part includes a configuration in which a transmission function and a reception function are used in a switching manner; a configuration in which a transmission element and a reception element are provided separately; and a configuration in which two sets of an electrical circuit are provided, transmission elements (transmission/reception elements) on both sides simultaneously transmit ultrasound, and reception elements (transmission/reception elements) on both sides simultaneously receive ultrasound.

When the ultrasound transmission/reception elements 2, 3 in FIG. 1 are driven at a frequency that corresponds to a wavelength equal to or greater than the diameter of the ultrasonic flow rate measurement tube 1, guided waves for which the ultrasonic flow rate measurement tube 1 and the fluid in the interior are considered a single medium are excited and propagated (see the above-mentioned non-patent reference 1 for details).

A difference ΔT between an ultrasound propagation time $T_1$ and an ultrasound propagation time $T_2$, the ultrasound propagation time $T_1$ being the time taken for ultrasound transmitted from the upstream-side ultrasound transmission/reception element 2 along the direction of the flow to be received by the downstream-side ultrasound transmission/reception element 3, and the ultrasound propagation time $T_2$ being the time taken for ultrasound transmitted by the downstream-side ultrasound transmission/reception element 3 in a reverse direction relative to the flow to be received by the upstream-side ultrasound transmission/reception element 2, is related to the flow velocity. Therefore, obtaining the propagation time difference ΔT makes it possible to measure the flow velocity of the fluid.

Where the flow velocity is expressed as v, the group velocity of the guided waves is expressed as $v_g$, the spacing between the ultrasound transmission/reception elements is expressed as L, and a factor representing the effect of the flow velocity of the fluid within the ultrasonic flow rate measurement tube on the group velocity of the guided waves is expressed as β (see JP-A 2007-298275 for details), the propagation time difference LT is expressed as follows.

$$\Delta T = T_2 - T_1 L/(v_g - \beta/(v_g + \beta v)) = [2L\beta/(v_g^2 - \beta^2 v^2)]v$$

$$\approx [2\beta/v_g^2]v$$

Therefore, the flow velocity v is obtained by $v \approx [v_g^2/2L\beta]\Delta T$ (Selection of Oscillation Frequency)

Since guided waves are velocity-dispersible, not all frequencies at which guided waves are excited are suitable for the ultrasonic flow rate meter, and it is not the case that guided waves of any mode can be used in the flow rate meter. It is necessary to select a mode at which the sensitivity is particularly high in a fluid portion.

Figure 2:
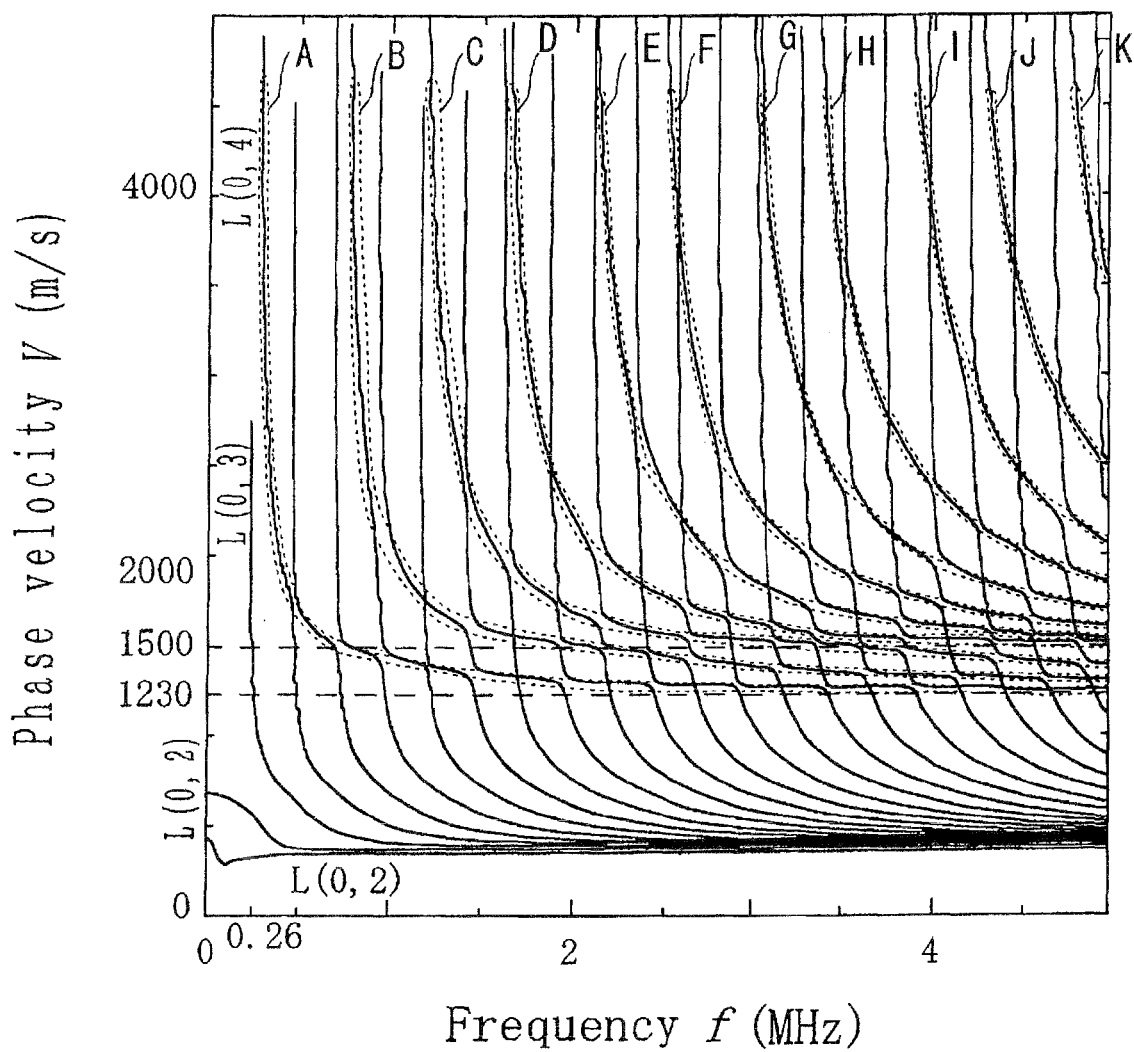
FIG. 2 is a drawing showing the phase velocity of guided waves propagating through an ⅛-inch pipe made from PFA (having an outside diameter of 3.17 mm and an inside diameter of 1.59 mm) the interior of which is filled with static water.

As a specific example, phase velocities of guided waves propagating through an ⅛-inch pipe made from PFA (with an outside diameter of 3.17 mm and an inside diameter of 1.59 mm), the interior of which is filled with static water, are shown in FIG. 2.

Each of the curves in FIG. 2 shows a mode displayed at L(0,1), L(0,2), L(0,3), L(0,4), and so on. Although labeling is only present up to L(0,4), plotting has been performed up to L(0,34). On the vertical axis of the drawing, 1500 m/s shows the longitudinal sound velocity of water, and 1230 m/s shows the longitudinal sound velocity of PFA.

From within FIG. 2, hypothetical modes indicated by alphabetic characters A, B, C, K in the drawing that link portions across a plurality of modes where the gradient is smaller near 1500 m/s, the longitudinal sound velocity of water, are effective. These portions having a more moderate gradient, though not continuous, are present across modes. It has been confirmed by calculation that when the amplitude of the guided waves is calculated in actual practice, although these portions are non-continuous in terms of frequency, the distribution of amplitudes is closer to the distribution of amplitudes of adjacent portions with a more moderate gradient than the distribution at other frequencies for the same mode. Accordingly, a "hypothetical mode" is thought to correspond to a guided wave that converges on the longitudinal sound velocity of a cylindrical wave. In the present invention, since a two-layered structure comprising the PFA pipe and water is present, the hypothetical modes first reach 1500 m/s, the longitudinal sound velocity of water, and then converge on 1230 m/s, the longitudinal sound velocity of PFA.

The hypothetical modes A, B, C, K are effective because the frequency dependence decreases near 1500 m/s, the longitudinal sound velocity of water. That the phase velocity is near the longitudinal sound velocity of water means there is more information related to water, and therefore more information related to the sound velocity.

Figure 3:
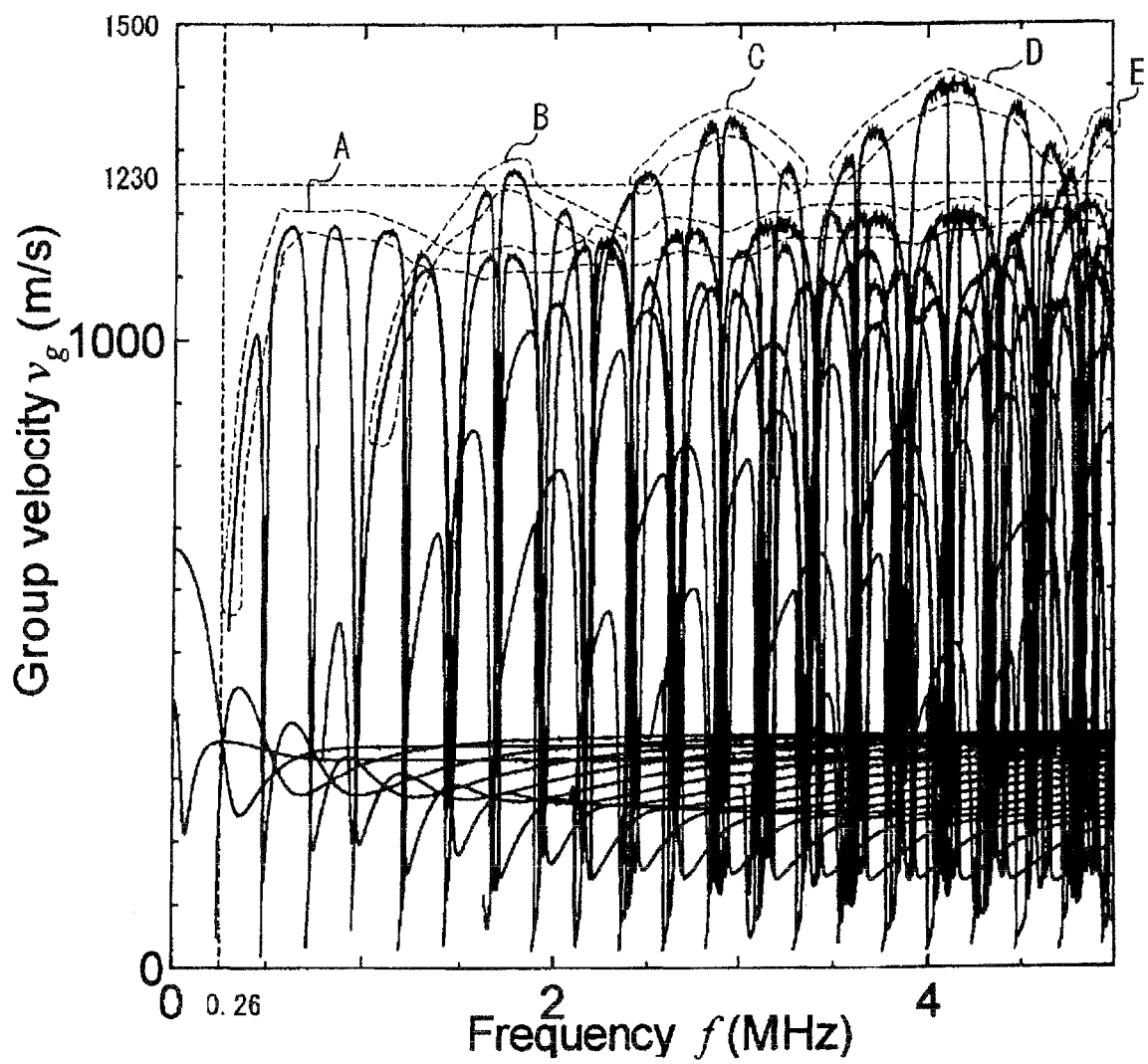
FIG. 3 is a drawing showing the result of calculating group velocities from FIG. 2.

FIG. 3 shows results of actually calculating the group velocity from FIG. 2.

For a basic calculation method, refer to the above-mentioned non-patent reference 2.

It can be observed that the group velocity of hypothetical modes indicated by Greek characters is larger.

Hypothetical modes diverge to infinity at a low frequency. In other words, at a low frequency, the group velocity is smaller; as the frequency increases, the group velocity gradually approaches the longitudinal sound velocity of water, and the amount of variation in the phase velocity decreases. The group velocity at this point is the nearest to the longitudinal sound velocity of water. This corresponds to each of the peaks of group velocities in FIG. 3. As the frequency increases further, the phase velocity starts to decrease again, and the group velocity therefore decreases. Then, approaching the longitudinal sound velocity of PFA, the variation in the phase velocity decreases again, and the group velocity also approaches the longitudinal sound velocity of PFA.

Within the range plotted in FIG. 3, it can be observed that using hypothetical modes that link portions, near the longitudinal sound velocity of water, at which the gradient is smaller at frequencies of 0.3 to 1.2 MHz, 1.5 to 1.9 MHz, 2.3 to 3.3 MHz, and 3.5 to 4.7 MHz corresponds to a shorter propagation time and an increased suitability for measurement.

Figure 4:
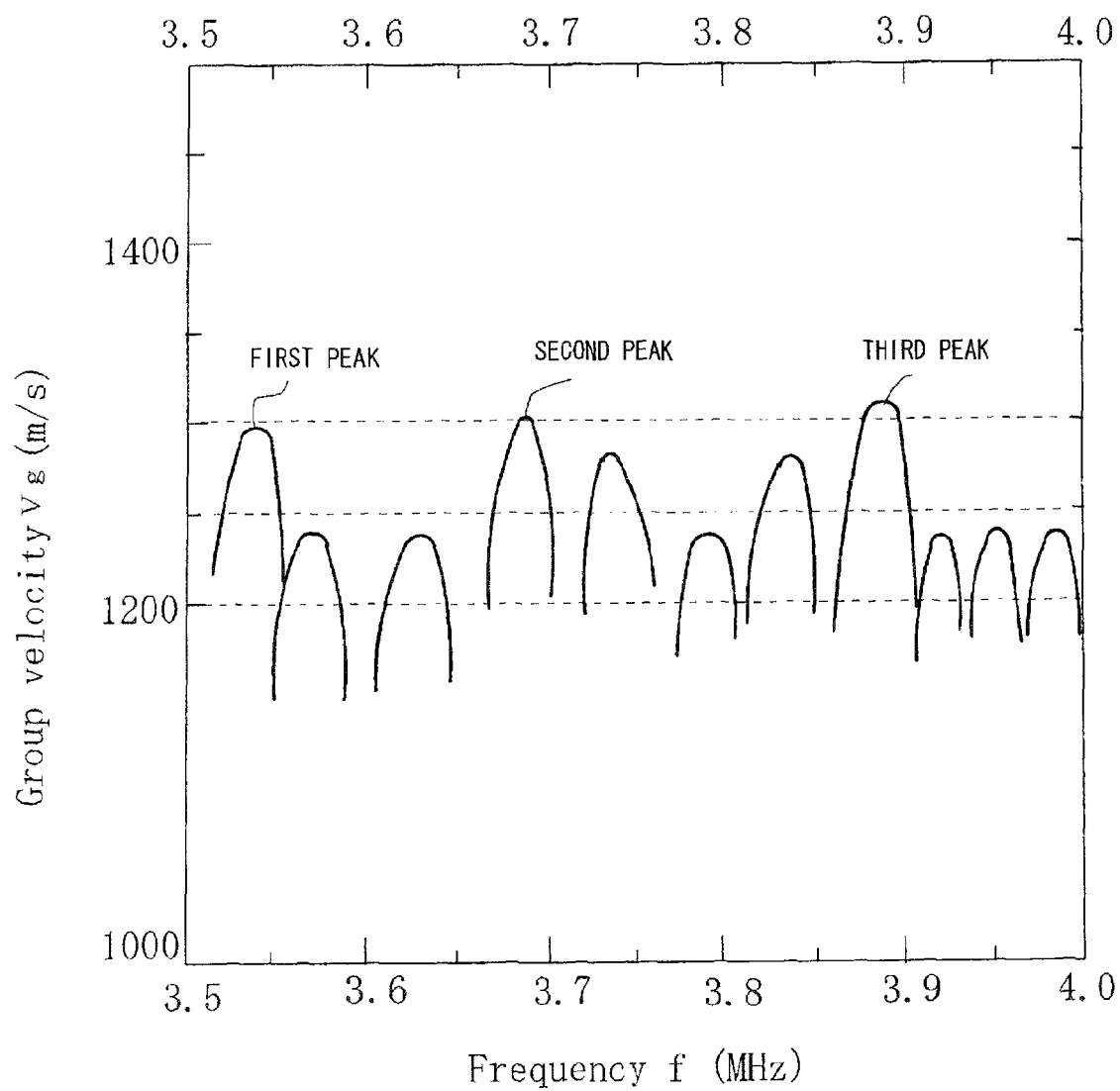
FIG. 4 shows group velocities of guided waves propagating through a PFA pipe (having an outside diameter of 15.56 mm and an inside diameter of 2.4 mm) the interior of which is filled with static water.

FIG. 4 shows the group velocity of guided waves propagating through a PFA pipe having an outside diameter of 15.56 mm and an inside diameter of 2.4 mm, the interior of which is filled with static water. In FIG. 4, from among the group velocities of the guided waves, only major, significant group velocities are shown, and minor ones are not shown. The group velocities were obtained using the same calculation method as that for FIG. 3.

Within the range plotted in FIG. 4, it is possible to observe three peaks at which the group velocity is approximately 1300 m/s near frequencies of 3.54 MHz (first peak), 3.68 MHz (second peak), and 3.88 MHz (third peak).

(Ultrasound Excited By Ultrasound Transmission/Reception Element)

The frequency of ultrasound excited by the ultrasound transmission/reception elements preferably agrees with the frequency at a group velocity peak. However, realistically, there exist differences between individual piezoelectric elements, differences between individual pipes, characteristics of an electronic circuit, and other factors; and it is difficult to cause the frequencies to agree. Therefore, it is preferable that a group velocity peak be isolated within a range of frequency width in which the ultrasound transmission/reception elements can perform excitation and detection. When guided waves having a plurality of frequencies are detected simultaneously, beat is generated; or, when there is a displacement in a frequency peak caused by, e.g., the effect of temperature, the waveform of the beat changes, adversely affecting the flow rate measurement. It can be seen that out of the three peaks in FIG. 4, the group velocity is large in the first, second, and third peaks; and that the second peak is isolated from the first and the third peaks.

Figure 5:
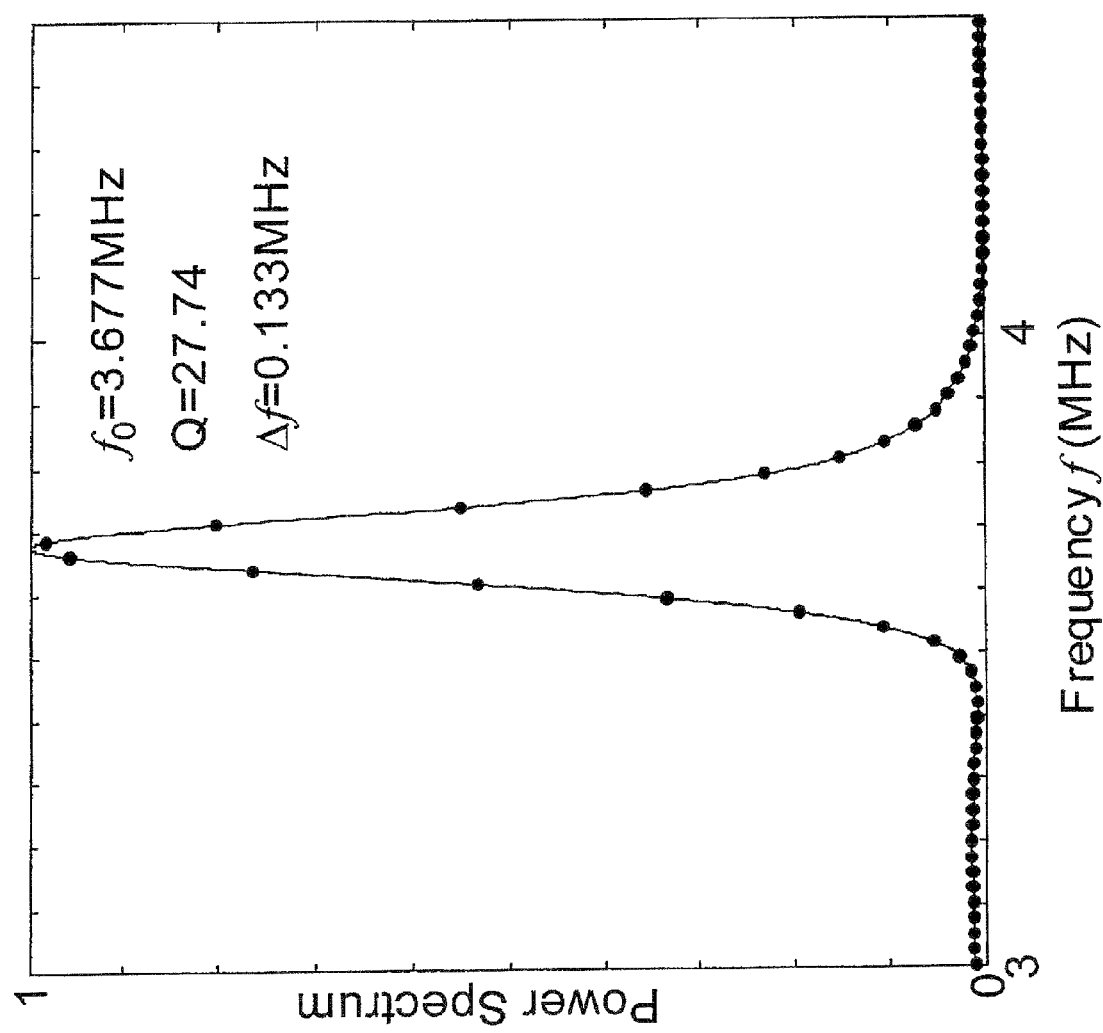
FIG. 5 shows an example of a power spectrum of a wave shape that has been excited/detected by an ultrasound transmission element/reception element readied for application in a device for measuring the group velocity of guided waves propagating through a PFA pipe shown in FIG. 4 having an outside diameter of 15.56 mm and an inside diameter of 2.4 mm the interior of which has been filled with static water.

FIG. 5 shows an example of a power spectrum of a wave profile that has been excited/detected by ultrasound transmission/reception elements readied for application in a device for measuring the group velocity of guided waves propagating through a PFA pipe shown in FIG. 4 having an outside diameter of 15.56 mm and an inside diameter of 2.4 mm, the interior of which has been filled with static water.

The resonance frequency at a resonance peak was $f_o$=3.677 MHz; a semi-amplitude of a frequency at which the vibration energy is half the resonance peak was Δf=0.133 MHz, and a dimensionless number representing the state of vibration was Q=27.74.

Figure 7:
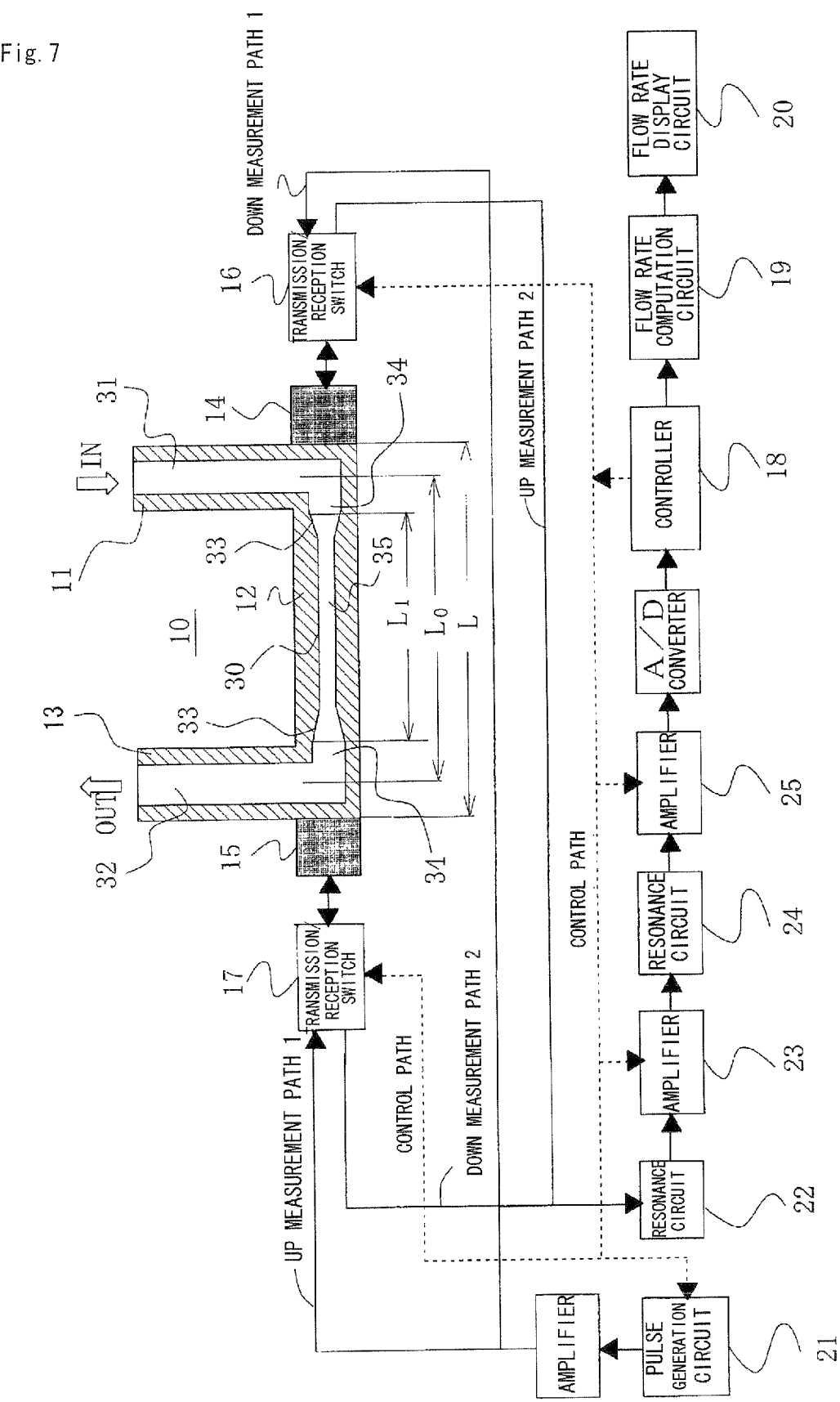
FIG. 7 illustrates the concept of a flow rate measuring device according to an embodiment of the present invention.

It was possible to have a relatively small semi-amplitude of Δf=0.133 MHz because there is used a signal in which an output from a pulse generation circuit is passed though a resonance circuit and an amplifier, and further passed through a resonance circuit and an amplifier, in order to amplify the signal, as shown in FIG. 7.

The presence of a plurality of peaks of group velocities of about the same size within the half width Δf leads to measurement error; therefore, it is necessary to set an appropriate width.

Figure 6:
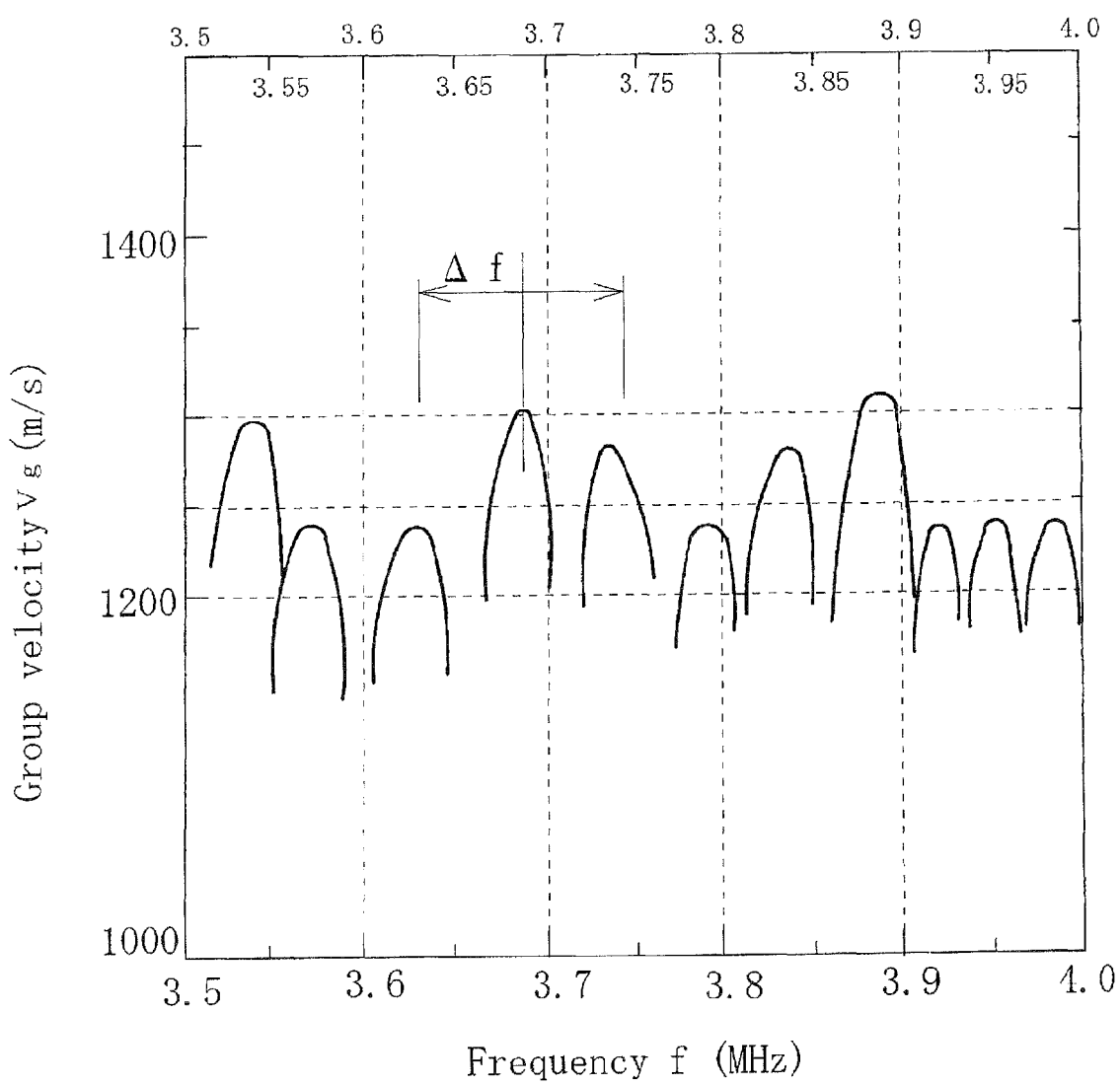
FIG. 6 shows a relationship between bandwidth and guided wave velocity dispersion.

FIG. 6 shows the relationship between band width and guided wave velocity dispersion.

$f_o$=3.677 MHz substantially agrees with the second peak in FIG. 4. The first peak and the third peak are significantly distant from a range corresponding to a half width of Δf=0.133 MHz centered on the second peak.

When the frequency band in which transmission or reception is performed by the ultrasound transmission/reception elements can be set near the second peak in FIG. 6, a stable flow rate measuring device can be obtained. However, at smaller frequencies, there is a possibility of the first peak coming within the half width Δf, and at larger frequencies, there is a possibility of the fifth peak coming within the half width Δf; and a stable flow rate measuring device cannot be obtained.

(Flow Rate Measuring Device)

FIG. 7 illustrates the concept of a flow rate measuring device according to an embodiment of the present invention.

In FIG. 7, a U-shaped ultrasonic flow rate measurement tube 10 that opens upwards is formed from a fluid inflow part 11, a flow rate measurement part 12, and a fluid outflow part 13. In the flow rate measurement part 12 of the ultrasonic flow velocity measurement tube 1, ultrasound transmission/reception elements 14, 15 are respectively disposed, with a predetermined distance L present therebetween, on an upstream side and a downstream side with respect to the flow direction. Each of the ultrasound transmission/reception elements 14, 15 is driven by a drive pulse from a transmission/reception switch 16, 17, respectively, made to oscillate, and made to generate and transmit ultrasound; and also receives ultrasound that has been transmitted. A reception wave corresponding to when the ultrasound transmission/reception elements 14, 15 oscillate is sent, via the transmission/reception switch 16, 17 and a controller 18, to a flow rate computation circuit 19; and the computation result is sent to a flow rate display circuit 20.

An amplification circuit, in which a resonance circuit 22, an amplifier 23, a resonance circuit 24, and an amplifier 25 are sequentially arranged, is connected between the transmission/reception switches 16, 17 and the controller 18 in order to amplify the signal. In this amplification circuit, a resonance circuit is used for amplifying the signal, and the amplification circuit therefore has an effect of making it possible to reduce the half width Δf of a power spectrum of an excited wave profile.

The amplification circuit, in which the resonance circuit 22, the amplifier 23, the resonance circuit 24, and the amplifier 25 are sequentially arranged, is not limited to being provided between the transmission/reception switches 16, 17 and the controller 18 shown in FIG. 7. A similar effect can also be achieved when the amplification circuit is provided between a pulse generation circuit 21 and the transmission/reception switches 16, 17.

An example of measuring the flow rate will now be described using FIG. 7.

(1) The transmission/reception switches 16, 17 make a switch to DOWN measurement paths.

(2) The pulse generation circuit 21 generates a pulse.

(3) The amplifier performs amplification to a wave profile of about ±10 V.

(4) An ultrasound pulse is transmitted from the ultrasound transmission/reception element 14 via a DOWN measurement path 1 to a flow path 30 of the flow rate measurement part 12.

(5) An ultrasound pulse is received by the ultrasound transmission/reception element 15.

(6) A reception signal is sent via a DOWN measurement path 2 to the amplification circuit comprising the resonance circuit 22, the amplifier 23, the resonance circuit 24, and the amplifier 25; and amplified.

(7) The received wave profile is converted by A/D conversion into digital data; and loaded into the controller 18.

(8) The flow rate computation circuit 19 calculates a DOWN propagation time $T_1$.

(9) The transmission/reception switches 16, 17 make a switch to an UP measurement path.

(10) The pulse generation circuit 21 generates a pulse.

(11) An amplifier performs amplification to a wave profile of about ±10 V.

(12) An ultrasound pulse is transmitted from the ultrasound transmission/reception element 15 via an UP measurement path 1 to the flow path 30 of the flow rate measurement part 12.

(13) An ultrasound pulse is received by the ultrasound transmission/reception element 14.

(14) A reception signal is sent via an UP measurement path 2 to the amplification circuit comprising the resonance circuit 22, the amplifier 23, the resonance circuit 24, and the amplifier 25; and amplified.

(15) The received wave profile is converted by A/D conversion into digital data; and loaded to the controller 18.

(16) The flow rate computation circuit 19 calculates an UP propagation time T2.

(17) The flow velocity is obtained from T1, T2, and the flow rate is obtained from the flow velocity.

Where the flow velocity of the fluid to be measured is expressed as v and the inside diameter of the flow path is expressed as r, the flow rate Q is Q=nr²v. In order to measure a very small flow rate flowing in the interior of a thin pipe used in a semiconductor-manufacturing device or a similar device, r may be made smaller and v may be made larger.

For example, if r is halved, v increases fourfold, and the detection sensitivity increases. However, as described in Prior Art 1, when r is smaller, it is necessary to perform an analysis as a guided wave. Also, when an ultrasound transmission/reception element that has a larger diameter is used, the amount of energy that can be injected is larger and the reception sensitivity/detection sensitivity is increased compared to an instance in which an ultrasound transmission/reception element that has a smaller diameter is used.

The flow path formed in the ultrasonic flow rate measurement tube 10 is formed such that the diameter is smaller in the flow rate measurement part 12 than in the fluid inflow part 11 and the fluid outflow part 13 as shown in FIG. 7. Specifically, the flow path 30 in the flow rate measurement part 12 is narrowed, at portions on both sides respectively connecting to a flow path 31 of the fluid inflow part 11 and a flow path 32 of the fluid outflow part 13, by a taper part 33; and has a smaller diameter at a center section compared to the flow paths in either direction. Therefore, the flow velocity in the flow path is raised, making it possible to raise the detection sensitivity.

Where $\phi_1$ is the diameter of a large-diameter flow path 34 at each portion on both sides of the flow path 30 and $\phi_2$ is the diameter of a small-diameter flow path 35 at the center section, $\phi_2/\phi_1$ is preferably set to a range of 1/10 to 2/3. Also, where $L_o$ is the total length of the flow path 30 and $L_1$ is the length of the small-diameter flow path 35 (including the length of the taper part 33), $L_1/L_0$ is preferably set to a range of 0.6 to 0.98.

Meanwhile, the ultrasound transmission/reception elements 14, 15 are respectively provided so as to face the large-diameter flow path 34 having a large diameter on both sides of the flow path 30 in the flow rate measurement part 12. The diameter of the ultrasound transmission/reception elements 14, 15 is set so as to be equal to or larger than the diameter of the large-diameter flow path 34. Thus setting the flow path 34 on both sides of the flow path 30 receiving energy from the ultrasound transmission/reception elements 14, 15 so as to have a large diameter, and setting the diameter of the ultrasound transmission/reception elements 14, 15 so as to be equal to or larger than the diameter of the large-diameter flow path, makes it possible to inject a large amount of energy into the flow path 30; and makes it possible to increase the cross-sectional area of a fluid portion necessary for the reception signal, enlarge the displacement of the fluid portion, and therefore to raise the reception sensitivity.

A description will now be given for the enlargement in the displacement of the fluid portion with reference to FIGS. 8 and 9.

Figure 8:
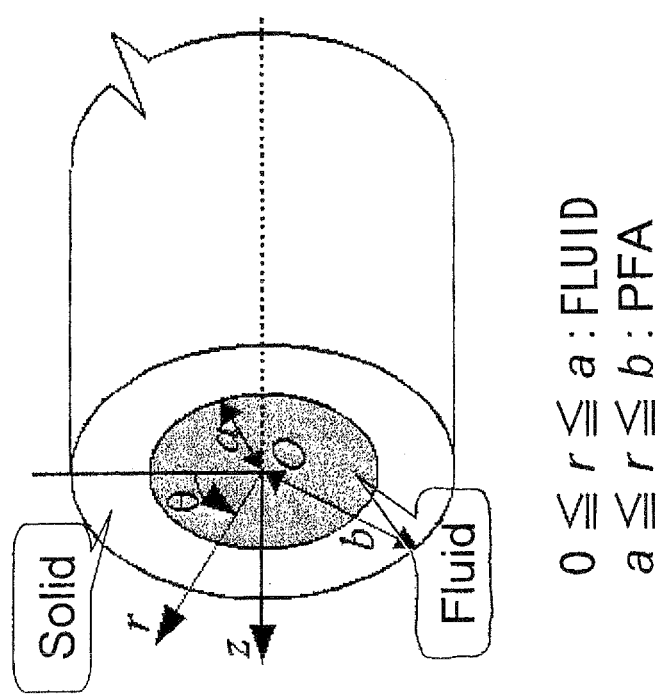
FIG. 8 shows a model of cylindrical coordinates in which the center of a pipe is the z-axis, used to calculate the phase velocity and the displacement (u) of a guided wave propagating in the z-axis direction.

Using cylindrical coordinates shown in FIG. 8 in which the center of the pipe is the z-axis, the phase velocity and the displacement (u) of a guided wave propagating in the z-axis direction were calculated.

With regards to component u, the direction of displacement and the propagating direction agree; therefore, u, is a component similar to a longitudinal wave. With regards to component $u_r$, the direction of displacement and the propagating direction are orthogonal to each other; therefore, $u_r$ is a component similar to a transverse wave. Since calculation is performed in an axisymmetric mode, $u_\theta$ is 0.

Figure 9:
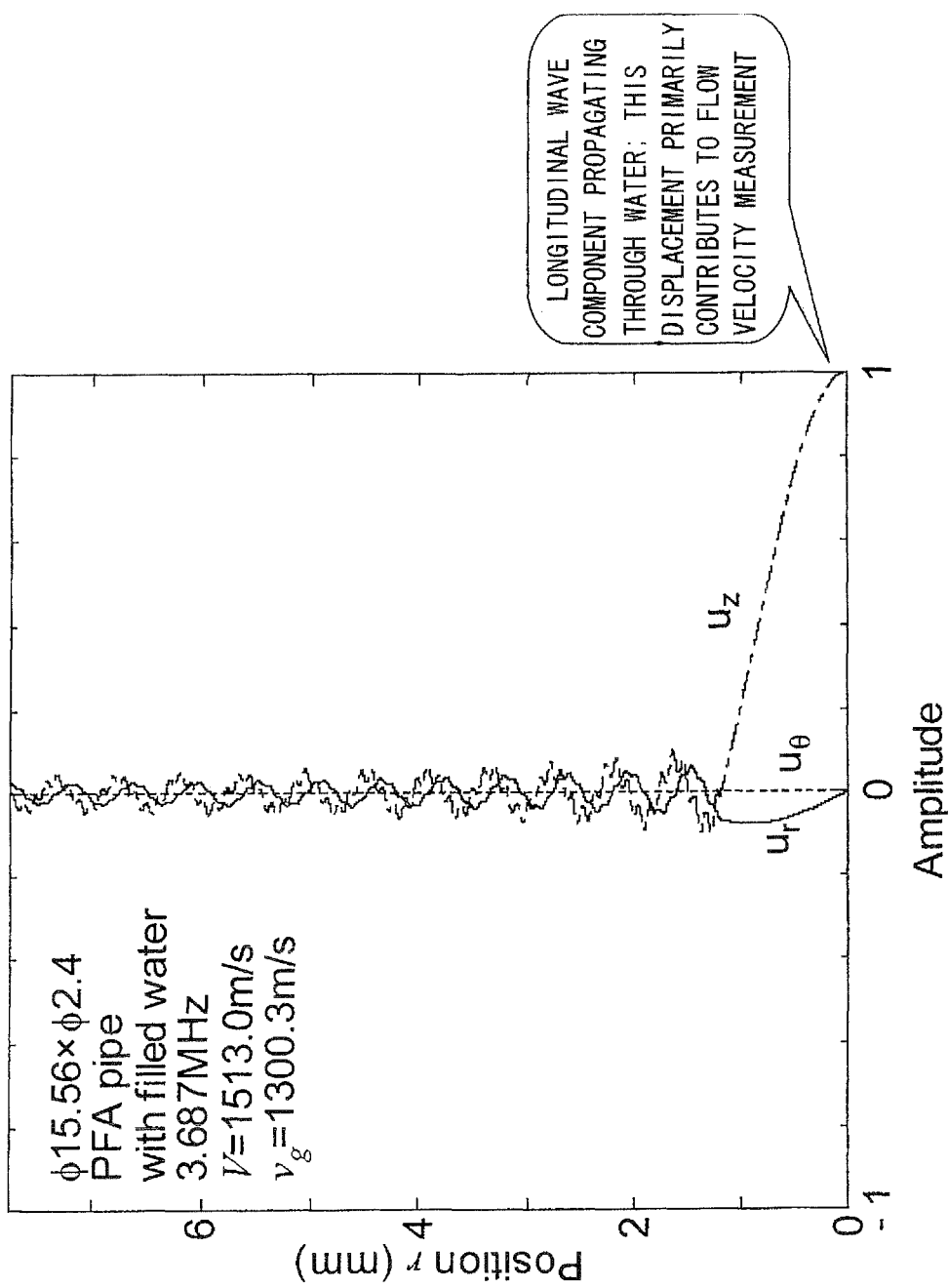
FIG. 9 shows the distribution of maximum displacements calculated using the model shown in FIG. 8.

FIG. 9 shows the distribution of maximum displacements based on calculation results.

It can be seen from FIG. 9 that the longitudinal-wave-component displacement $u_z$ of the fluid portion is large.

The guided wave propagates through the pipe portion and the fluid portion simultaneously. However, the proportion of displacement in the pipe portion or the fluid portion is dependent on mode and frequency.

However, the longitudinal-wave-component displacement $u_z$ of the fluid portion primarily contributes towards flow velocity measurement.

In order to excite a guided wave having a large amplitude, it is preferable that the area of the ultrasound transmission/reception elements be increased, but in order to raise the flow velocity sensitivity, it is preferable that the cross-sectional area of the flow path be reduced. However, such a setting is disadvantageous in terms of signal-to-noise ratio.

Therefore, configuring the center section of the flow path 30 as the small-diameter flow path 35 and both sides of the center section as the large-diameter flow path 34 makes it possible to enlarge and receive the longitudinal-wave-component displacement $u_z$ of the fluid portion while raising the flow velocity sensitivity, improve the signal-to-noise ratio, and raise the reception sensitivity.

A description will now be given by way of example.

As a comparative example, a device was used in which the flow path 30 has a uniform diameter along the entire length and the diameter of the flow path is 2.5 mm.

As an embodiment of the present invention, a device was used in which the diameter of the large-diameter flow path 34 on both sides of the flow path 30 is 6.0 m and the diameter of the small-diameter flow path 35 at the center is 2.5 mm.

$L_1/L_o$ was 0.625.

The effective area for the embodiment, when compared to the effective area for the comparative example, was $3^2 n/1.25^2 n = 9/1.5625 = 5.76$-fold larger. It is made possible to increase the amount of energy that can be injected into the flow path 30, and enlarge and receive the longitudinal-wave-component displacement a of the fluid portion.

[Key]
1 Ultrasonic flow velocity measurement tube
2 Ultrasound transmission/reception element
3 Ultrasound transmission/reception element
4 Ultrasound transmission/reception device
5 Ultrasound transmission/reception device
6 Controller
7 Flow rate computation circuit
8 Flow rate display circuit
10 Ultrasonic flow rate measurement tube
11 Fluid inflow part
12 Flow rate measurement part
13 Fluid outflow part
14 Ultrasound transmission/reception element
15 Ultrasound transmission/reception element
16 Transmission/reception switch
17 Transmission/reception switch
18 Controller
19 Flow rate computation circuit
20 Flow rate display circuit
21 Pulse generation circuit
22 Resonance circuit
23 Amplifier
24 Resonance circuit
25 Amplifier
30 Flow path in flow rate measurement part
31 Flow path in fluid inflow part
32 Flow path in fluid outflow part
33 Taper part
34 Large-diameter flow path at portions at both sides of flow path
35 Small-diameter flow path at center

The invention claimed is:
1. A flow rate measuring device comprising:
a flow rate measurement part having two sides, wherein the flow rate measurement part comprises a first ultrasound transmission element/reception element on one side and a second ultrasound transmission element/reception element on the other side, with a distance L therebetween, wherein the resonance frequency of each ultrasound transmission element/reception element is a frequency of an isolated peak of group velocities of guided waves, from among a plurality of peaks of group velocities of guided waves, and wherein the semi-amplitude of a power spectrum of ultrasound excited/received by the ultrasound transmission element/reception elements is a value that does not overlap with another peak of group velocities;
a flow rate computation circuit for calculating a propagation time T1 and a propagation time T2, wherein the flow rate computation circuit further obtains a flow velocity of a fluid from a propagation time difference between propagation time T1 and propagation time T2, the propagation time T1 being a time in which a first guided wave, excited by being driven by the first ultrasound transmission element/reception element, propagates from upstream to downstream to the second ultrasound transmission element/reception element set apart by gap L, and the propagation time T2 being a time in which a second guided wave, excited by being driven by the second ultrasound transmission element/reception element, propa- gates from downstream to upstream to the first ultrasound transmission element/reception element set apart by gap L.

2. The flow rate measuring device of claim 1, further comprising an amplification circuit comprising a first resonance circuit, a first amplifier, a second resonance circuit, and a second amplifier sequentially arranged.

3. The flow rate measuring device of claim 1, wherein the amplification circuit is located between a pulse generation circuit on one side and each of the first and second ultrasound transmission element/reception elements on a second side.

4. The flow rate measuring device according to claim 3, wherein a diameter of each an entrance side and an exit side of a flow path of the flow rate measurement part is larger than a diameter of a center section, and the entrance side as well as the exit side are connected to the center section in a tapered manner.

5. The flow rate measuring device according to claim 4, wherein $\phi_1$ is the diameter of the entrance side and the exit side of the flow path of the flow rate measurement part and $\phi_2$ is the diameter of the center section, and $\phi_2/\phi_1$ is set to a range of 1/10 to 2/3.

6. The flow rate measuring device according to claim 5, wherein $L_0$ is the total length of the flow path of the flow rate measurement part and $L_1$ is the length of the flow path at the center section, and $L_1/L_0$ is set to a range of 0.6 to 0.98.

7. The flow rate measuring device according to claim 4, wherein $L_0$ is the total length of the flow path of the flow rate measurement part and $L_1$ is the length of the flow path at the center section, and $L_1/L_0$ is set to a range of 0.6 to 0.98.

8. The flow rate measuring device according to claim 3, wherein $\phi_1$ is the diameter of the entrance side and the exit side of the flow path of the flow rate measurement part and $\phi_2$ is the diameter of the center section, and $\phi_2/\phi_1$ is set to a range of 1/10 to 2/3.

9. The flow rate measuring device according to claim 8, wherein $L_0$ is the total length of the flow path of the flow rate measurement part and $L_1$ is the length of the flow path at the center section, and $L_1/L_0$ is set to a range of 0.6 to 0.98.

10. The flow rate measuring device of claim 1, wherein the amplification circuit is arranged between a controller on one side and each of the first and second ultrasound transmission element/reception elements on a second side.

11. The flow rate measuring device according to claim 10, wherein a diameter of each an entrance side and an exit side of a flow path of the flow rate measurement part is larger than a diameter of a center section, and the entrance side as well as the exit side are connected to the center section in a tapered manner.

12. The flow rate measuring device according to claim 11, wherein $L_0$ is the total length of the flow path of the flow rate measurement part and $L_1$ is the length of the flow path at the center section, and $L_1/L_0$ is set to a range of 0.6 to 0.98.

13. The flow rate measuring device according to claim 1, wherein a diameter of each an entrance side and an exit side of a flow path of the flow rate measurement part is larger than a diameter of a center section, and the entrance side as well as the exit side are connected to the center section in a tapered manner.

14. The flow rate measuring device according to claim 13, wherein $\phi_1$ is the diameter of the entrance side and the exit side of the flow path of the flow rate measurement part and $\phi_2$ is the diameter of the center section, and $\phi_2/\phi_1$ is set to a range of 1/10 to 2/3.

15. The flow rate measuring device according to claim 14, wherein $L_0$ is the total length of the flow path of the flow rate measurement part and $L_1$ is the length of the flow path at the center section, and $L_1/L_0$ is set to a range of 0.6 to 0.98.

16. The flow rate measuring device according to claim 13, wherein $L_0$ is the total length of the flow path of the flow rate measurement part and $L_1$ is the length of the flow path at the center section, and $L_1/L_0$ is set to a range of 0.6 to 0.98.

* * * * *